United States Patent
Kawakami et al.

(10) Patent No.: US 8,072,949 B2
(45) Date of Patent: Dec. 6, 2011

(54) WIRELESS NODE APPARATUS, AND MULTIHOP WIRELESS LAN SYSTEM

(75) Inventors: Tetsuya Kawakami, Kanagawa (JP); Yoshihiro Suzuki, Tokyo (JP)

(73) Assignee: Panasonic Corporation, Osaka (JP)

( * ) Notice: Subject to any disclaimer, the term of this patent is extended or adjusted under 35 U.S.C. 154(b) by 901 days.

(21) Appl. No.: 11/579,512

(22) PCT Filed: Apr. 25, 2005

(86) PCT No.: PCT/JP2005/007788
§ 371 (c)(1),
(2), (4) Date: May 16, 2007

(87) PCT Pub. No.: WO2005/109764
PCT Pub. Date: Nov. 17, 2005

(65) Prior Publication Data
US 2007/0291679 A1    Dec. 20, 2007

(30) Foreign Application Priority Data
May 7, 2004  (JP) .................. 2004-139166

(51) Int. Cl.
*H04W 4/00*  (2009.01)
(52) U.S. Cl. ....... 370/338; 370/315; 370/331; 455/41.2; 455/435.1; 375/212
(58) Field of Classification Search ............ 455/41.2, 455/435.1; 370/315, 338, 331; 375/212
See application file for complete search history.

(56) References Cited

U.S. PATENT DOCUMENTS

| 6,804,710 | B1 | 10/2004 | Kawada et al. |
| 7,254,132 | B2 * | 8/2007 | Takao et al. .................. 370/390 |
| 7,634,230 | B2 * | 12/2009 | Ji et al. ......................... 455/41.2 |
| 2003/0210706 | A1 * | 11/2003 | Chang et al. .................. 370/466 |
| 2004/0023617 | A1 * | 2/2004 | Mahany et al. ............. 455/41.1 |
| 2004/0103282 | A1 * | 5/2004 | Meier et al. ................... 713/171 |

FOREIGN PATENT DOCUMENTS

| JP | 2000 069046 | 3/2000 |
| JP | 2001 237764 | 8/2001 |
| JP | 2001 326660 | 11/2001 |
| WO | 9702680 | 1/1997 |
| WO | 0223832 | 3/2002 |
| WO | 02076028 | 9/2002 |

OTHER PUBLICATIONS

PCT International Search Report dated Jun. 7, 2005.
Supplementary European Search Report dated Aug. 13, 2007.

* cited by examiner

*Primary Examiner* — Dwayne Bost
*Assistant Examiner* — Amancio Gonzalez
(74) *Attorney, Agent, or Firm* — Dickinson Wright PLLC

(57) ABSTRACT

A wireless node apparatus in a multihop wireless LAN with a tree structure having a plurality of wireless node apparatuses, at least some of which become relay apparatuses to provide multihop communication, transfers packets among wireless nodes as done in a tree type LAN, without intervening a root node, to communicate among the wireless nodes.

12 Claims, 6 Drawing Sheets

FIG. 8A

| | IEEE 802.11 MAC HEADER | | | | | IEEE 802.3 MAC HEADER | |
|---|---|---|---|---|---|---|---|
| | TO DS | FROM DS | ADDRESS 1 | ADDRESS 2 | ADDRESS 3 | ADDRESS 4 | Src MAC | Dst MAC |
| 8 → 5 | 1 | 0 | AP5 | STA8 | NODE 11 | — | NODE 8 | NODE 11 |
| 5 → 9 | 0 | 1 | STA9 | AP5 | NODE 8 | — | NODE 8 | NODE 11 |
| 9 → 11 | 0 | 1 | STA11 | AP9 | NODE 8 | — | NODE 8 | NODE 11 |

FIG. 8B

| TO DS | FROM DS | ADDRESS 1 | ADDRESS 2 | ADDRESS 3 | ADDRESS 4 |
|---|---|---|---|---|---|
| 0 | 1 | DA | BSSID | SA | — |
| 1 | 0 | BSSID | SA | DA | — |

FIG. 9

| MAC ADDRESS (IEEE 802.3) | MAC ADDRESS (IEEE 802.11) | MAC-TYPE |
|---|---|---|
| NODE 1 | AP2 | MAC-STA |
| NODE 2 | AP2 | MAC-STA |
| NODE 3 | AP2 | MAC-STA |
| NODE 4 | AP2 | MAC-STA |
| NODE 6 | AP2 | MAC-STA |
| NODE 7 | AP2 | MAC-STA |
| NODE 8 | STA8 | MAC-AP |
| NODE 9 | STA9 | MAC-AP |
| NODE 10 | STA9 | MAC-AP |
| NODE 11 | STA9 | MAC-AP |

WIRELESS NODE APPARATUS, AND MULTIHOP WIRELESS LAN SYSTEM

TECHNICAL FIELD

The present invention relates to a wireless node apparatus, and a multihop wireless LAN system that achieve communications among wireless node apparatuses in a network like a wireless LAN which can ensure ad-hock mutual communication thereamong.

BACKGROUND ART

IEEE 802.11, the present standard technique for a wireless LAN, defines two modes as wireless LAN modes. One is an ad hock mode in which a group is formed by wireless nodes (hereinafter also called wireless node apparatuses) which radio waves directly reach to ensure direct communications without intervening a specific base station (hereinafter also called AP (Access Point)), and the other is an infra mode in which an AP is used, and wireless nodes within a range where radio waves from the AP reach (hereinafter also called STA (Station)) are connected to the AP in a star pattern, and can communicate with one another. The use of such a wireless LAN technique can permit wireless nodes to participate in and leave communications in an ad hock manner and execute mobile communications. Those communications however require that radio waves should directly reach a communication destination in ad hock mode, and radio waves should directly reach the AP in infra mode, disabling communications with parties which radio waves cannot directly reach only with wireless links.

The prospect of a wireless LAN is disclosed in Patent Document 1, mentioned below, as a way to speed up mobile communication. A method of constructing a multihop wireless network among wireless nodes is illustrated as one means of widening a service providing area in a system in which the communication area of a base station (AP) is smaller as compared with a mobile communication for a PDC (Personal Digital Cellular) or the like. The invention disclosed in the following patent document aims only at allowing each wireless node to communicate with a base station on a star network so that each wireless node should merely establish a relay path to the base station, and establishes such a configuration that the base station is ranked the highest-rank station among the base station and the wireless nodes and each wireless node specifically determines higher-rank wireless nodes. Further disclosed is a system where the highest-rank station (base station) does not entirely control the establishment of a star multihop wireless network, but the multihop wireless network is autonomously realized as each wireless node selects a higher-rank wireless node with the minimum number of hops to the base station based on the number of hops from the base station, as the optimal wireless node to be connected.

Patent Document 1: Japanese Patent Application Publication No. 2001-237764 (FIG. 1)

In the multihop wireless network having a tree structure with the base station ranked top and each wireless node merely relaying packets received from lower-rank wireless nodes to higher-rank wireless nodes, like the invention disclosed in Patent Document 1, however, packets transmitted from each wireless node are always transferred to the base station, disabling direct communications among wireless nodes. If wireless nodes belonging to the same leaf (wireless node 1001 and wireless node 1002) attempt to communicate with each other on the multihop wireless network as shown in FIG. 10, for example, a base station 1000 should receive packets once, which should be returned into the multihop wireless network. This raises a problem such that not only the delay time is increased, but also bands are used wastefully, thus wasting wireless resources.

DISCLOSURE OF THE INVENTION

The present invention has been made to overcome the foregoing problem, and aims at providing a wireless node apparatus and a multihop wireless LAN system which can transfer packets among wireless nodes as done in a tree type LAN, without intervening a root node which is a wireless node to be the origin of the tree to achieve efficient communications among the wireless nodes.

To achieve the object, according to the invention, there is provided a wireless node apparatus in a multihop wireless LAN with a tree structure having a plurality of wireless node apparatuses at least some of which become relay apparatuses to ensure multihop communication, the multihop wireless LAN being constructed by allowing an arbitrary wireless node apparatus in the multihop wireless LAN to determine whether the arbitrary wireless node apparatus itself is a root wireless node apparatus positioned at a top of the multihop wireless LAN upon activation, and allowing the arbitrary wireless node apparatus to notify status information including a connection state, stored in local memory means, to wireless node apparatuses to be connected when determining that the wireless node apparatus is the root wireless node apparatus, and when determining that the wireless node apparatus is not the root wireless node apparatus, allowing the arbitrary wireless node apparatus to request other wireless node apparatuses to be connection candidates as higher-rank base stations to acquire status information, select a higher-rank base station wireless node apparatus to be connected from the other wireless node apparatuses to be connection candidates as the higher-rank base stations and connect to the higher-rank base station wireless node apparatus based on the status information acquired in response to the request, and when the arbitrary wireless node apparatus is made a connection candidate as a higher-rank base station later, to notify status information of the arbitrary wireless node apparatus to still other wireless node apparatuses which make an acquisition request for the status information, the wireless node apparatus including bridge transfer means which, with the multihop wireless LAN being constructed, transfers packets from the still other wireless node apparatuses connected as higher-rank base stations to the higher-rank base station wireless node apparatus or the still other wireless node apparatuses connected as higher-rank base stations, or transfers a packet from the higher-rank base station wireless node apparatus to the still other wireless node apparatuses connected as higher-rank base stations. This configuration can establish a LAN of a layer 2 in the connected multihop wireless network to ensure mutual communications.

In the wireless node apparatus of the invention, it is preferable that in case of selecting a wireless node apparatus to be connected as the higher-rank base station, when the status information includes a number of hops from the root wireless node apparatus, a maximum connection number which is a maximum number of wireless node apparatuses connectable to the candidate higher-rank base station, and a current connection number which is a current number of wireless node apparatuses connected to the candidate higher-rank base station, a wireless node apparatus with a minimum number of hops should be selected from those wireless node apparatuses whose current connection numbers have not reached the maximum connection number. This configuration can establish a tree network around a root wireless node apparatus while avoiding concentration of connections to wireless nodes near the root wireless node apparatus.

In the wireless node apparatus of the invention, it is preferable that in case of selecting a wireless node apparatus to be connected as the higher-rank base station, that wireless node apparatus whose current connection number is minimum should be further selected. This configuration can prevent the number of connections from becoming uneven among wireless nodes with the same number of hops from the root wireless node apparatus.

It is preferable that in case of sending the packet to wireless node apparatuses other than the local wireless node apparatus, the bridge transfer means in the wireless node apparatus of the invention should capsulate a packet having a first MAC header indicating a final destination address and a first source address using a second MAC header having an address of a wireless node apparatus to be a next relay apparatus in a first predetermined field and an address of the local wireless node apparatus which is currently relaying in a second predetermined field. This configuration can ensure packet transfer to any wireless node.

It is preferable that upon reception of the capsulated packet, the bridge transfer means in the wireless node apparatus of the invention should rewrite the address in the first predetermined field of the second MAC header with the address of the wireless node apparatus to be the next relay apparatus, and rewrite the address in the second predetermined field of the second MAC header with the address of the local wireless node apparatus. This configuration can ensure packet transfer to any wireless node.

It is preferable that upon reception of the capsulated packet, the bridge transfer means in the wireless node apparatus of the invention should store the source address in the first MAC header and the address in the second predetermined field of the second MAC header in association with each other. This configuration can ensure efficient multihop transfer.

According to the invention, there is provided a multihop wireless LAN system in which a multihop wireless LAN with a tree structure having a plurality of wireless node apparatuses at least some of which become relay apparatuses to ensure multihop communication, the multihop wireless LAN being constructed by allowing an arbitrary wireless node apparatus in the multihop wireless LAN to determine whether the arbitrary wireless node apparatus itself is a root wireless node apparatus positioned at a top of the multihop wireless LAN upon activation, and allowing the arbitrary wireless node apparatus to notify status information including a connection state, stored in local memory means, to wireless node apparatuses to be connected when determining that the wireless node apparatus is the root wireless node apparatus, and when determining that the wireless node apparatus is not the root wireless node apparatus, allowing the arbitrary wireless node apparatus to request other wireless node apparatuses to be connection candidates as higher-rank base stations to acquire status information, select a higher-rank base station wireless node apparatus to be connected from the other wireless node apparatuses to be connection candidates as the higher-rank base stations and connect to the higher-rank base station wireless node apparatus based on the status information acquired in response to the request, and when the arbitrary wireless node apparatus is made a connection candidate as a higher-rank base station later, to notify status information of the arbitrary wireless node apparatus to still other wireless node apparatuses which make an acquisition request for the status information, with the multihop wireless LAN being constructed, the arbitrary wireless node apparatus transferring packets from the still other wireless node apparatuses connected as higher-rank base stations to the higher-rank base station wireless node apparatus or the still other wireless node apparatuses connected as higher-rank base stations, or transferring a packet from the higher-rank base station wireless node apparatus to the still other wireless node apparatuses connected as higher-rank base stations. This configuration can establish a LAN of a layer 2 in the connected multihop wireless network to ensure mutual communications.

It is preferable that in the multihop wireless LAN system of the invention, in case of selecting a wireless node apparatus to be connected as the higher-rank base station, when the status information includes a number of hops from the root wireless node apparatus, a maximum connection number which is a maximum number of wireless node apparatuses connectable to the candidate higher-rank base station, and a current connection number which is a current number of wireless node apparatuses connected to the candidate higher-rank base station, a wireless node apparatus with a minimum number of hops should be selected from those wireless node apparatuses whose current connection numbers have not reached the maximum connection number. This configuration can establish a tree network around a root wireless node apparatus while avoiding concentration of connections to wireless nodes near the root wireless node apparatus.

It is preferable that in the multihop wireless LAN system of the invention, in case of selecting a wireless node apparatus to be connected as the higher-rank base station, that wireless node apparatus whose current connection number is minimum should be further selected. This configuration can prevent the number of connections from becoming uneven among wireless nodes with the same number of hops from the root wireless node apparatus.

It is preferable that in case of sending the packet to wireless node apparatuses other than the local wireless node apparatus, the arbitrary wireless node apparatus in the multihop wireless LAN system of the invention should capsulate a packet having a first MAC header indicating a final destination address and a first source address using a second MAC header having an address of a wireless node apparatus to be a next relay apparatus in a first predetermined field and an address of the local wireless node apparatus which is currently relaying in a second predetermined field. This configuration can ensure packet transfer to any wireless node.

It is preferable that upon reception of the capsulated packet, the arbitrary wireless node apparatus in the multihop wireless LAN system of the invention should rewrite the address in the first predetermined field of the second MAC header with the address of the wireless node apparatus to be the next relay apparatus, and rewrite the address in the second predetermined field of the second MAC header with the address of the local wireless node apparatus. This configuration can ensure packet transfer to any wireless node.

It is preferable that upon reception of the capsulated packet, the arbitrary wireless node apparatus in the multihop wireless LAN system of the invention should store the source address in the first MAC header and the address in the second predetermined field of the second MAC header in association with each other. This configuration can ensure efficient multihop transfer.

The wireless node apparatus and the multihop wireless LAN system of the invention have the above-described configurations, and, with a tree multihop wireless network being constructed around one wireless node, can ensure packet transfer among wireless nodes as done in a tree LAN without intervening a root node which is the wireless node to be the origin of the tree, thereby achieving efficient communications among wireless nodes.

BRIEF DESCRIPTION OF THE DRAWINGS

[FIG. 8A] A diagram for explaining the details of a header of a packet to be received and transmitted by the wireless node apparatus according to the embodiment of the invention.

[FIG. 8B] A diagram showing values in individual Address fields defined by IEEE 802.11 in the wireless node apparatus according to the embodiment of the invention.

[FIG. 9] A diagram for explaining the structure of a table to be used to change the header of a packet to be received and transmitted by the wireless node apparatus according to the embodiment of the invention.

BEST MODE FOR CARRYING OUT THE INVENTION

Figure 1:
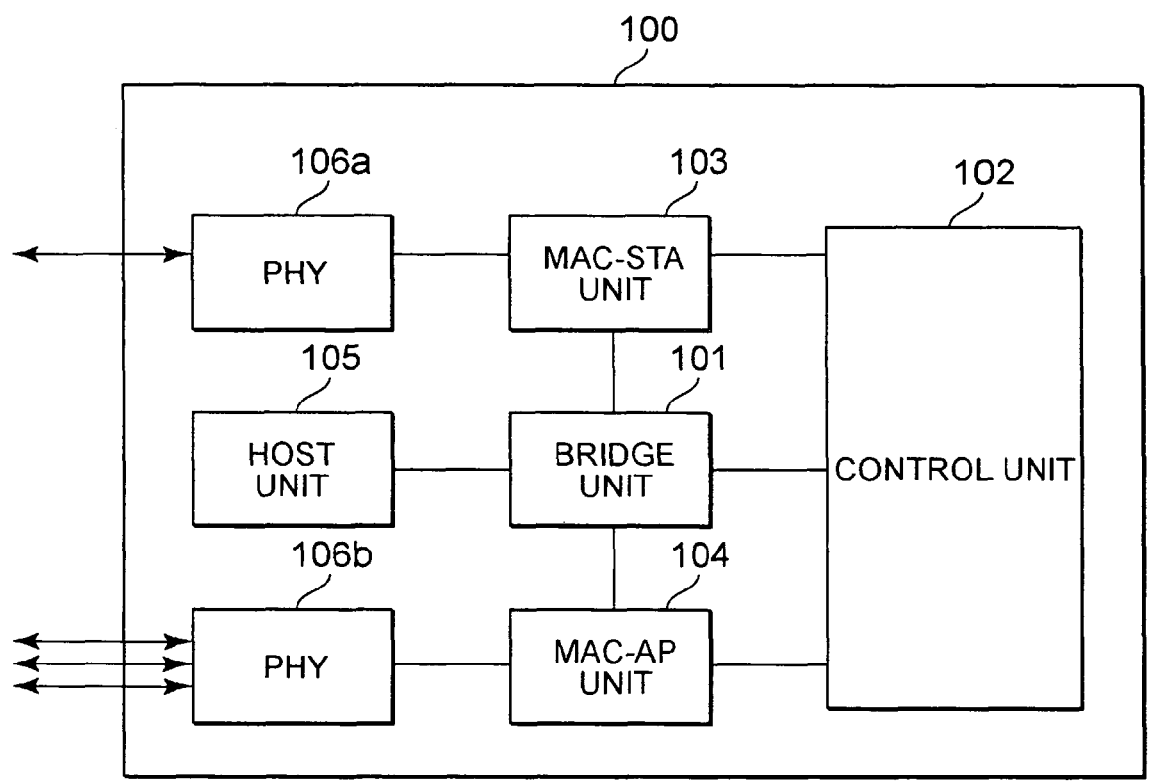
[FIG. 1] A configuration diagram showing the configuration of a wireless node apparatus according to an embodiment of the invention.
Figure 2:
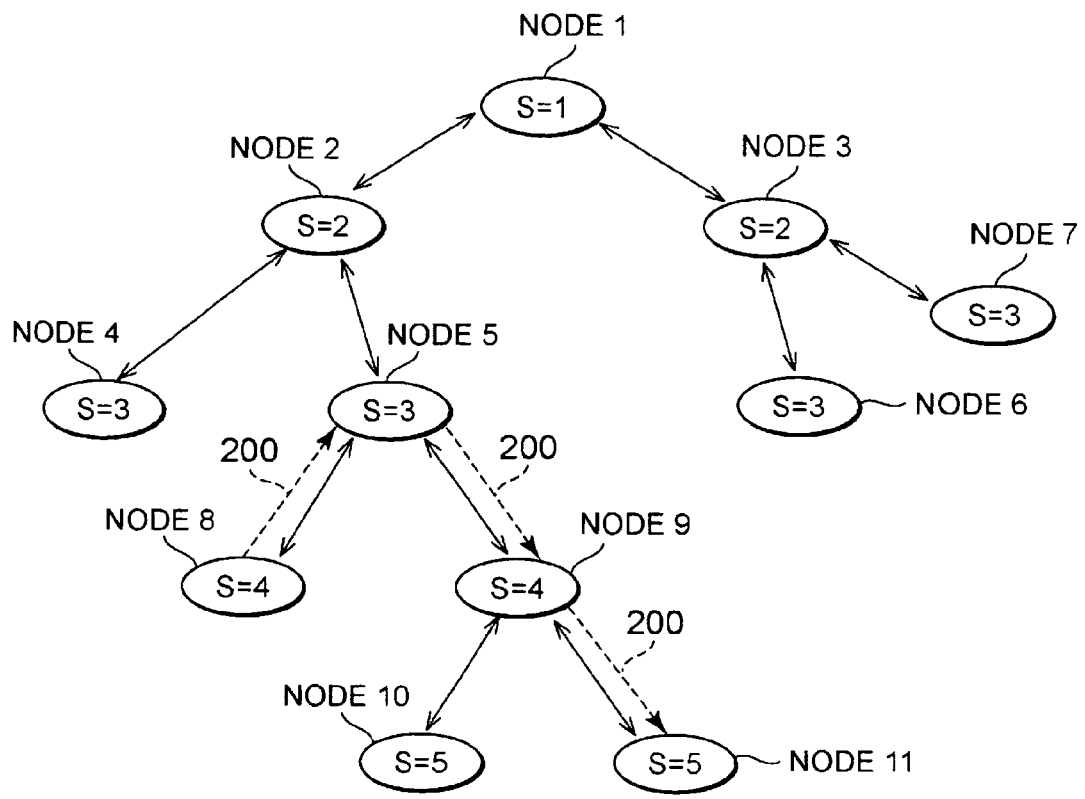
[FIG. 2] A diagram showing a multihop wireless LAN system according to an embodiment of the invention.
Figure 3:
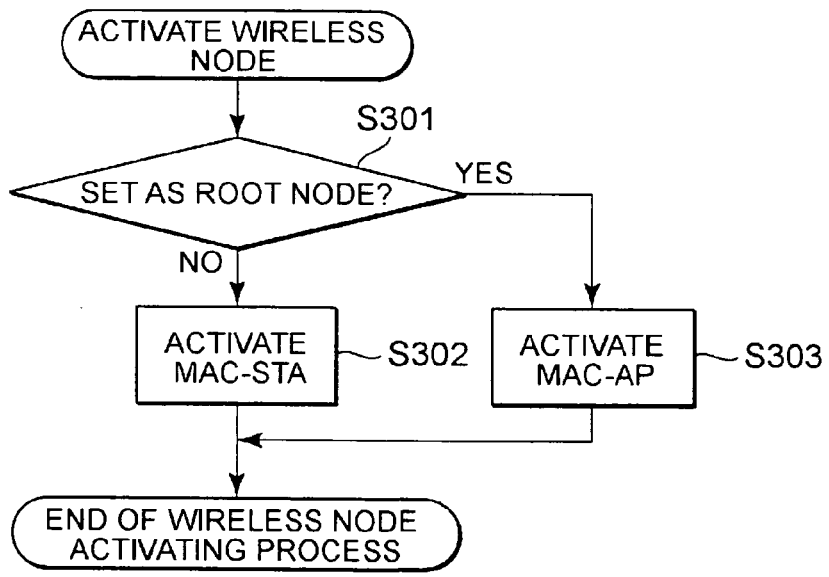
[FIG. 3] A flowchart for explaining a process when the wireless node apparatus according to the embodiment of the invention is activated.
Figure 4:
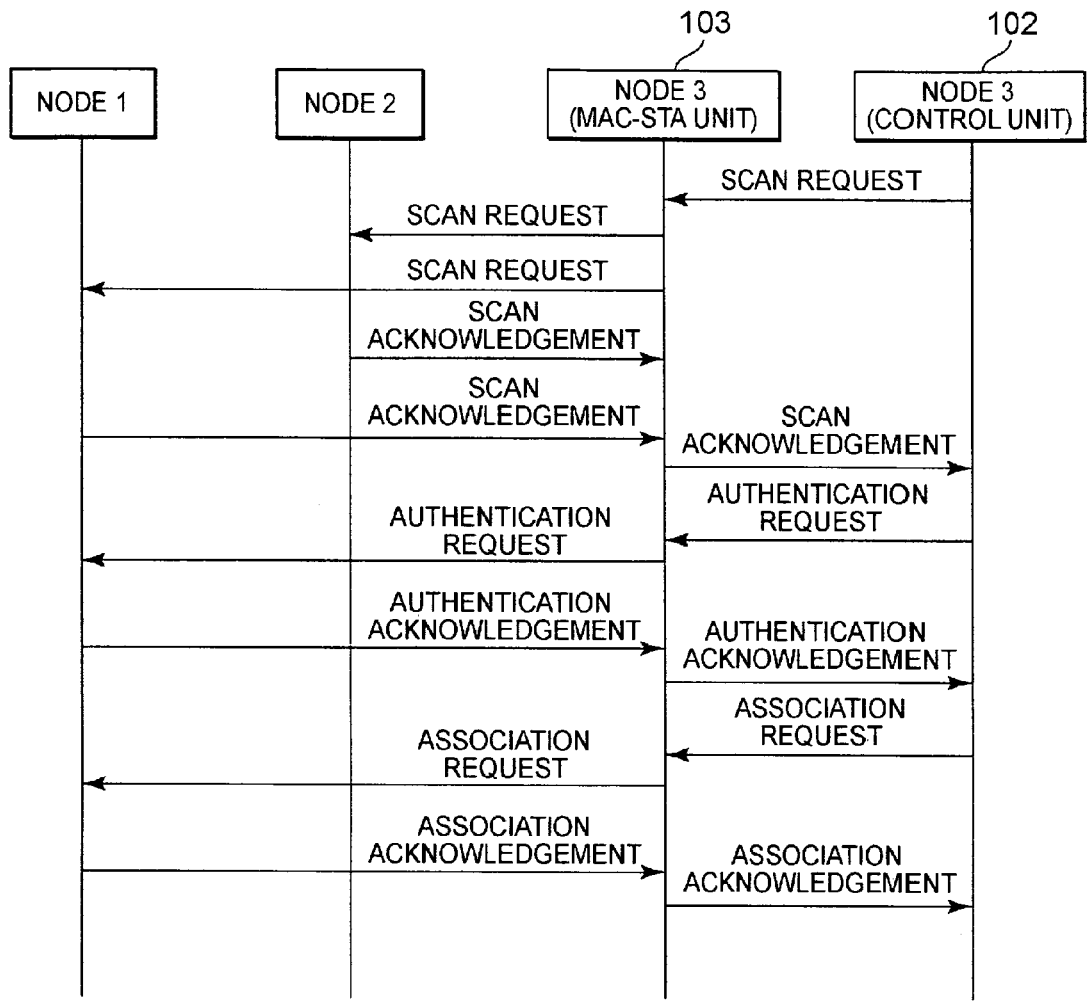
[FIG. 4] A sequence chart for explaining a sequence until connection of the wireless node apparatus according to the embodiment of the invention to a higher-rank wireless node.
Figure 5:
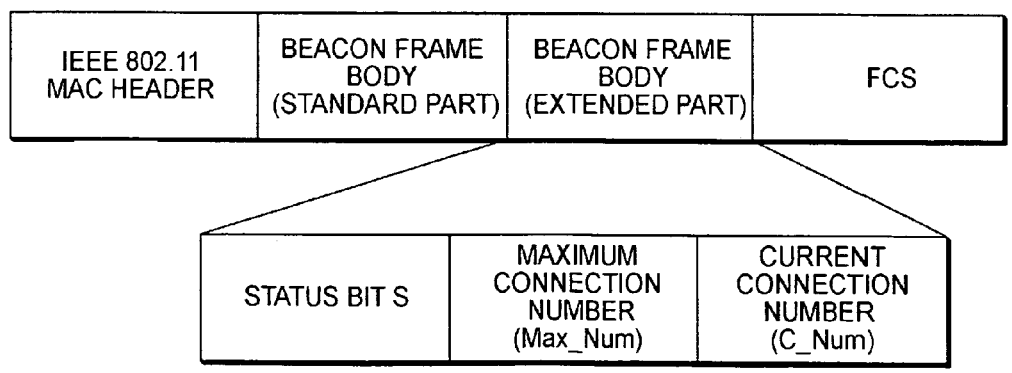
[FIG. 5] A diagram for explaining a format to be received as a SCAN acknowledgement in the wireless node apparatus according to the embodiment of the invention.

A wireless node apparatus and a multihop wireless LAN system according to embodiments of the invention will be described below with reference to FIGS. 1 to 9. FIG. 1 is a configuration diagram showing the configuration of a wireless node apparatus according to an embodiment of the invention. FIG. 2 is a diagram showing a multihop wireless LAN system according to an embodiment of the invention. FIG. 3 is a flowchart for explaining a process when the wireless node apparatus according to the embodiment of the invention is activated. FIG. 4 is a sequence chart for explaining a sequence until connection of the wireless node apparatus according to the embodiment of the invention to a higher-rank wireless node. FIG. 5 is a diagram for explaining a format to be received as a SCAN acknowledgement in the wireless node apparatus according to the embodiment of the invention.

Figure 6:
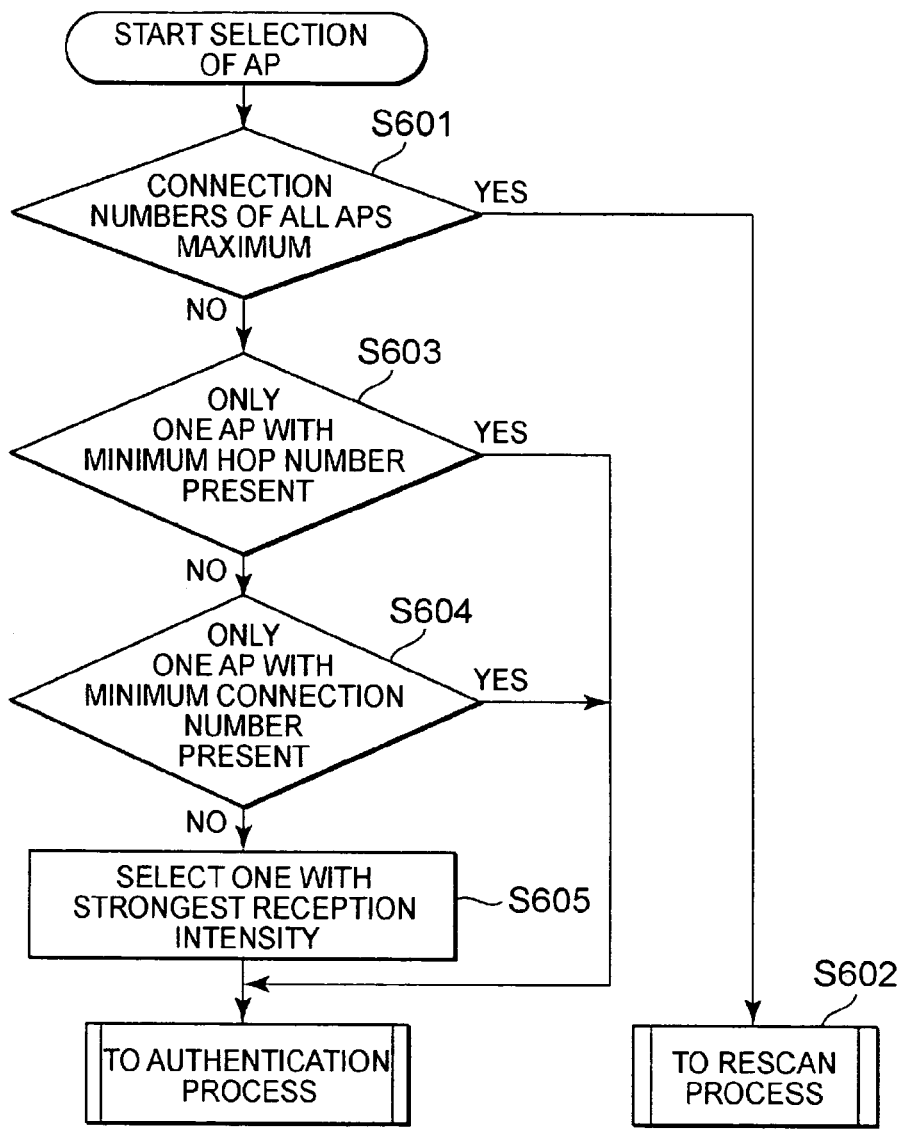
[FIG. 6] A flowchart for explaining an AP selection process in the wireless node apparatus according to the embodiment of the invention.
Figure 7:
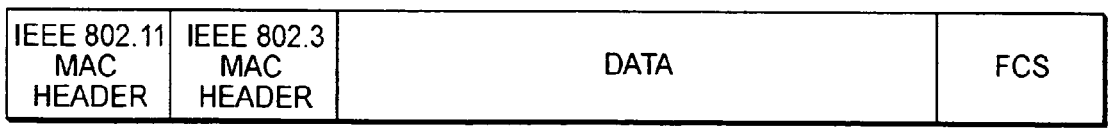
[FIG. 7] A diagram for explaining the format of a data frame in the wireless node apparatus according to the embodiment of the invention.
Figure 10:
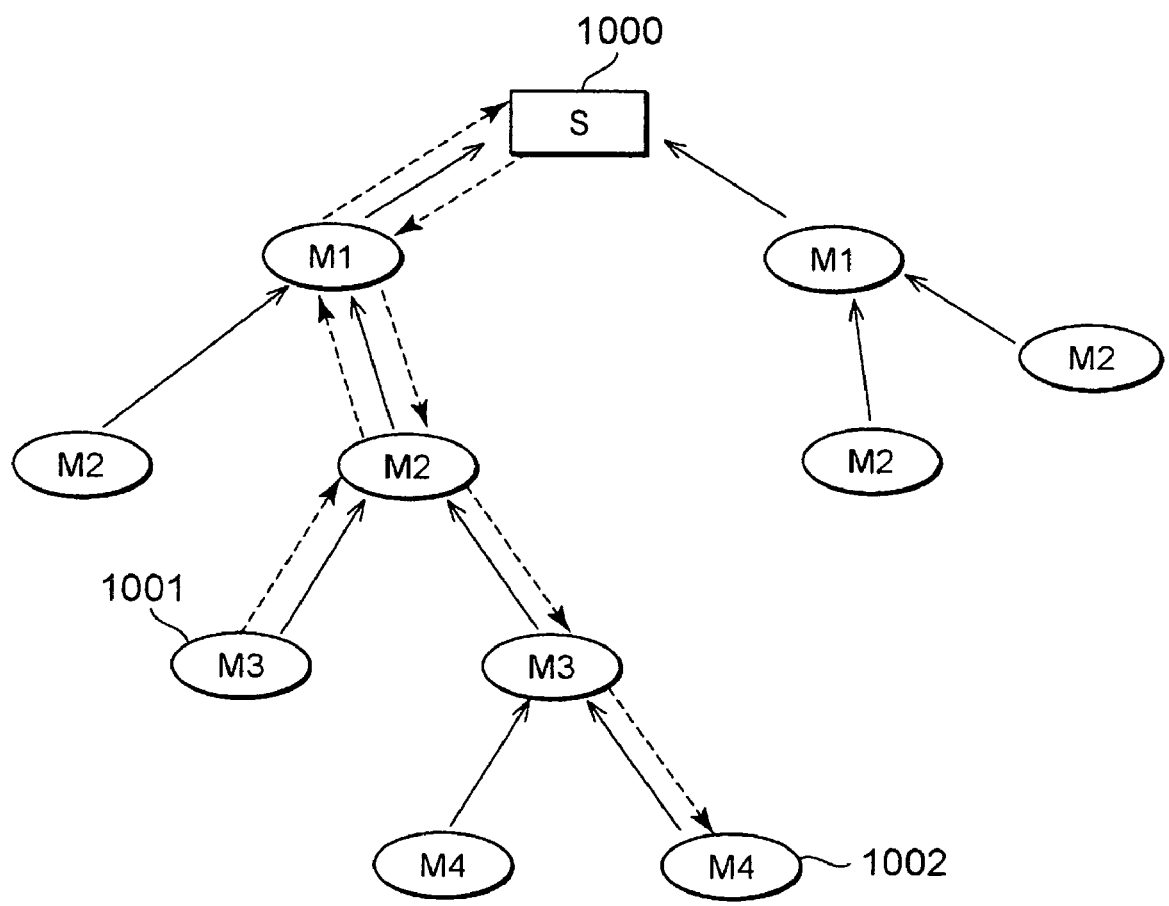
[FIG. 10] A diagram showing communications among wireless nodes in a conventional multihop wireless LAN.

FIG. 6 is a flowchart for explaining an AP selection process in the wireless node apparatus according to the embodiment of the invention. FIG. 7 is a diagram for explaining the format of a data frame in the wireless node apparatus according to the embodiment of the invention. FIG. 8A is a diagram for explaining the details of a header of a packet to be transmitted and received by the wireless node apparatus according to the embodiment of the invention. FIG. 8B is a diagram showing values in individual Address fields defined by IEEE 802.11 in the wireless node apparatus according to the embodiment of the invention. FIG. 9 is a diagram for explaining the structure of a table to be used to change the header of a packet to be transmitted and received by the wireless node apparatus according to the embodiment of the invention.

First, communications which are carried out by wireless nodes on the multihop wireless LAN system according to the embodiment of the invention will be explained referring to FIG. 2. The individual wireless nodes have the same functions, and no special apparatus which operates as a base station is required. In the multihop wireless LAN system (hereinafter, also simply called network), a network with a tree structure is constructed around a wireless node set as a root node. The root node does not have a special function on packet transfer, except that it is simply the top of the tree. When a packet from a wireless node (hereinafter, also simply called node) 8 addressed to a node 11 is output along a path 200, as shown in FIG. 2, a node 5 checks the address of the received packet from its own leaf (a lower layer of the tree), and transfers the packet to a node 9, not a higher-rank node, when determining that the received packet is addressed to a node beyond the node 9 which is another leaf of the node 5. That is, each node performs an operation similar to that of a layer 2. The embodiment of the invention is premised on that the root node has been manually set beforehand, and only one wireless node is set as the root node on the wireless LAN system.

As each node checks the address of a packet and packet transfer is performed not only a higher-rank node and a lower-rank node but also between lower-rank apparatuses, it is possible to make the delay time shorter and effectively use the communication band, as compared with the system of transferring a packet to the root node and then reverting it for communication. Further, the multihop wireless LAN system according to the embodiment of the invention realizes such a tree network at the layer 2. This makes it possible to construct a network without depending on a layer 3. The configuration of a wireless node and a method of constructing the tree will be explained below.

The wireless node apparatus according to the embodiment of the invention will be explained referring to FIG. 1. A configuration example using MAC and PHY defined by IEEE 802.11 is illustrated. A wireless node apparatus 100 comprises large two MAC units 103, 104, a bridge unit 101 which connects them, a control unit 102 which sets the functions thereof and performs control thereof, a host unit 105 which is connected to the bridge unit 101 and runs an application or the like, and PHY 106a, 106b to be wireless physical layers. The two MAC units are the MAC-STA unit 103 and the MAC-AP unit 104. The MAC-STA unit 103 and the MAC-AP unit 104 perform different operations. The MAC-STA unit 103 operates as a terminal in infra mode of IEEE 802.11 (STA: Station), and the MAC-AP unit 104 operates as a base station (AP: Access Point). Although different PHYs are respectively connected to the two MAC units in the embodiment of the invention, a configuration having two MAC units connected to a single PHY may be employed.

When the MAC-STA unit 103 attempts, as a terminal station, to connect to an AP, the MAC-STA unit 103 requests the wireless node serving as the AP to acquire status information of the wireless node as the AP. Then, the MAC-STA unit 103 establishes a connection relationship with a specific AP designated by the control unit 102, and performs communication only through wireless links present between itself and the AP. When the MAC-AP unit 104 is connected as a base station, the MAC-AP unit 104 notifies wireless nodes to be connected of status information stored in an unillustrated predetermined memory field of the MAC-AP unit 104. Then, the MAC-AP unit 104 establishes connection relationships with the STAs of a plurality of wireless nodes which attempt to connect to the MAC-AP unit 104 as AP, forming a star structure with the MAC-AP unit 104 being in the center. As the MAC-AP unit 104 itself takes a star structure around itself, and the star network is connected to higher-rank wireless nodes by the MAC-STA unit 103, the tree network around the root node constructed finally.

The bridge unit 101 operates as a bridge of the layer 2. The bridge unit 101 connects the MAC-STA unit 103 and the MAC-AP unit 104 together, transfers a packet received from a higher-rank wireless node, i.e., a packet received by the MAC-STA unit 103, to the MAC-AP unit 104, and transfers a packet received from a lower-rank wireless node, i.e., a packet received by the MAC-AP unit 104, to the MAC-STA unit 103 or once again to the MAC-AP unit 104. For the transfer, the bridge unit 101 learns the address of the received packet, and constructs a table as shown in FIG. 9 to be described later.

The process upon activation of the wireless node apparatus according to the embodiment of the invention will be explained referring to FIG. 3. As shown in FIG. 3, when the wireless node apparatus 100 is set as the root node upon activation (YES in step S301), the wireless node apparatus 100 operates as an AP, so that the MAC-AP unit 104 capable of holding a plurality of wireless nodes is activated and sets S=1 to a status bit (S) which is one of status information (step S303). When the wireless node apparatus 100 is not set as the root node upon activation (NO in step S301), the MAC-STA unit 103 capable of connecting to a single AP is activated (step S302). Here, the status bit (S) indicates the level from the root node, and indicates the number of hops with the root node being S=1.

The following explanation will be given of a sequence from new activation of the node 3 while only the node 1 and the node 2 in FIG. 2 are activated up to connection of the node 3 to higher-rank wireless nodes with reference to FIG. 4. Because the node 3 is not set so as to operate as the root node, the MAC-STA unit 103 is activated when the node 3 is activated. The control unit 102 causes the MAC-STA unit 103 to make a SCAN request to acquire the statuses of connectable wireless nodes. Accordingly, the MAC-STA unit 103 of the node 3 broadcasts a frame of the SCAN request. Of the wireless nodes which have received the frame, only those wireless nodes whose MAC-AP units 104 are already activated respond by a frame shown in FIG. 5. The format of this frame will be discussed later. After a certain time elapses, the MAC-STA unit 103 gives information of the statuses of all the wireless nodes received to the control unit 102 as a SCAN acknowledgement.

The control unit 102 performs an AP selection process shown in FIG. 6 to be described later, based on the information of those statuses. When AP selection is successful, the control unit 102 performs authentication and an association process on the selected AP. When the process till association is completed, the control unit 102 sets a value obtained by adding 1 to the value of the status bit (S) as its status bit (S), and then activates the MAC-AP unit 104. As only wireless nodes connected at higher levels activate their MAC-AP units 104, only the root node activates the MAC-AP unit 104 at the beginning as has been explained in the activation process in FIG. 3. Accordingly, a tree having leaves sequentially constructed with the root node being in the center is constructed.

Referring to FIG. 5, the following will describe a format for that of the wireless nodes having received the SCAN request whose MAC-AP unit 104 has already been activated notifies information of its status as a SCAN acknowledgement. In the embodiment of the invention, a beacon frame by IEEE 802.11 is extended to notify new information. This information includes three kinds of information, a status bit, a maximum connection number and a current connection number. The maximum connection number indicates the maximum value of terminals (STA) to which the MAC-AP unit 104 of a single wireless node can connect, and can be set individually. The current connection number indicates the number of terminals (STA) connected to the MAC-AP unit 104.

The above-described AP selection process will be explained with reference to FIG. 6. FIG. 6 illustrates the process flow in the control unit 102 that selects a higher-rank wireless node to be connected based on information on a status at the time of receiving a SCAN acknowledgement. First, it is checked whether or not there is a connectable AP using a status bit, a maximum connection number, and a current connection number in status information on all APs obtained by the SCAN acknowledgement. The control unit 102 determines whether or not all of the APs have the maximum connection number (step S601), and when it is determined that there are only APs which have the maximum connection numbers, it is construed that no connectable APs are present, and a rescan process is executed (step S602). As the maximum connectable number can be set for each wireless node in this manner, it is possible to limit the connection number in accordance with the bandwidth of a wireless link. This makes it possible to prevent too many wireless nodes from being connected to one AP, which would otherwise increase the overhead of an access control and lower the communication efficiency.

When the control unit 102 determines that the connection number is not the maximum, the control unit 102 compares status bits (S) of the connectable APs each indicating the number of hops from the root node, and determines whether or not there is only one AP whose status bit is at the minimum (step S603). When there are two or more APs which have the smallest status bits, the control unit 102 compares the numbers of wireless nodes (current connection numbers) to which the APs satisfying the foregoing condition are already connected, and determines whether or not there is only one AP which has the minimum connection number (step S604). When there are two or more APs which have the maximum connection numbers, the control unit 102 compares the reception intensities of the APs satisfying the foregoing condition at the time of receiving the SCAN acknowledgement, and selects one which has the strongest reception intensity (step S605). As leaves are sequentially constituted from not only the hop number, but also the connection number in this manner, it is possible to construct a tree in such a way that the bandwidth is efficiently used by the entire network, not dominated by a single AP.

Next, a method of transferring packets over a network with a tree structure will be explained. In the wireless node apparatus 100 according to the embodiment of the invention, IEEE 802.11 is used as a wireless access technique. Accordingly, a packet is transferred and received using the MAC header of IEEE 802.11. However, because IEEE 802.11 does not involve the multihop concept, a destination MAC address, a source MAC address, and a BSSID indicating an AP are generally used in a MAC header in infrastructure mode. Normally, the BSSID is the MAC address of an AP. Let us consider a case where the node 8 transfers a packet to the node 11 in FIG. 2.

When the node 8 outputs a packet which has a destination MAC address=the MAC address of the node 11, a source MAC address=the MAC address of the node 8, and a BSSID=the MAC address of the node 5, the MAC-AP unit 104 of the node 5 construes that MAC addresses other than the MAC addresses of nodes connected to the node 5 are MAC addresses of those not connected to link destinations of the node 5, and the packet is transferred to a DS (Destination System) defined by IEEE802.11, to the bridge unit 101 in this embodiment. Even if the bridge unit 101 recognizes that the node 11 is not on a higher-rank wireless node side, but on a lower-rank side, and transfers the packet to the MAC-AP unit 104 again, there is no wireless node that receives the output packet, and the packet cannot be transferred to the node 11 when the destination MAC address=the MAC address of the node 11.

When multihop is performed through the node 9, it is necessary that the packet output from the MAC-AP unit 104 of the node 5 is set as the destination MAC address=the MAC address of the node 9. In the embodiment, therefore, the IEEE 802.3 Ethernet® frame is capsulated with the IEEE 802.11 MAC header as shown in FIG. 7. In the IEEE 802.3 MAC header, the MAC address of a final wireless node is used as the destination MAC address, and the MAC address of the sender itself is used as the source MAC address. According to the IEEE 802.11 MAC header, transfer is performed while each address is converted into addresses of wireless nodes with which the local node directly communicates. The details of the header are shown in FIGS. 8A and 8B.

As shown in FIG. 8A, the IEEE 802.3 MAC header always has the destination MAC address (Dst MAC)=the MAC address of the node 11, and the source MAC address (Src MAC)=the MAC address of the node 8. As the IEEE 802.11 MAC address (Address 3) is set for the node 11, the MAC-AP unit 104 which has received the packet transfers the packet to the bridge unit 101. Next, the bridge unit 101 determines the transfer destination from the destination MAC address in the IEEE 802.3 header, replaces the header for transferring the packet to the wireless node 9, and sends the packet to the MAC-AP unit 104 again. The IEEE 802.11 header of the packet from the wireless node 5 to the wireless node 9 has the destination MAC address=the MAC address of the STA 9, the source MAC address=the MAC address of the node 8, and the BSSID=the MAC address of the AP 5.

Because the destination MAC address indicates the STA 9 in this manner, the wireless node 9 can receive the packet, and the MAC-STA unit 103 receives the packet. The packet received by the MAC-STA unit 103 is sent to the bridge unit 101 by default. The bridge unit 101 replaces the IEEE 802.11 header by using the MAC address of the node 11 of the destination MAC address in the IEEE 802.3 header, and sends the packet to the MAC-AP unit 104. Accordingly, a frame having a header, which has the destination MAC address=the MAC address of the STA 11, the source MAC address=the MAC address of the node 8, and the BSSID=the MAC address of the AP 9, is finally sent from the wireless node 9 to the wireless node 11, and the frame reaches the wireless node 11. Note that FIG. 8B illustrates the value of each address field defined by IEEE 802.11, DA stands for Destination Address, and SA stands for Source Address.

Next, the operation of the bridge unit 101 will be explained referring to FIG. 9 which illustrates the structure of a table used by the bridge unit 101 for determining a transfer destination and replacing a header. FIG. 9 is an example of the table of the wireless node 5. In receiving the packet, like a regular Ethernet® bridge, the bridge unit 101 learns a destination MAC address (IEEE 802.3). At this time, in comparison with a case where the regular Ethernet® bridge configures a table of reception ports and MAC addresses, information on from which MAC-Type the reception is made, i.e., whether reception is made from the MAC-STA unit 103 or MAC-AP unit 104, and the address of the IEEE 802.11 header of the received packet are used to configure a table in the embodiment of the invention, as shown in FIG. 9.

Regarding the address of the IEEE 802.11 header, the bridge unit 101 learns the SA in the case of the reception from the MAC-AP unit 104, or the BSSID in the case of the reception from the MAC-STA unit 103. This is the value of the IEEE 802.11 Address 2, and becomes the value to be entered into the IEEE 802.11 Address 1 when transfer is performed with respect to a node indicated by the destination MAC address of the learned IEEE 802.3 header. For example, the wireless nodes 1 to 4, 6, and 7 are on the higher-rank sides than the wireless node 5, and in transferring a packet to those wireless nodes, the MAC-STA unit 103 transfers the packet to the wireless node 2 that is a higher-rank wireless node to which the node 5 is connected.

In this respect, the MAC address of the AP 2 is used as the IEEE 802.11 MAC address. Regarding the lower-rank nodes, the bridge unit 101 distinguishes and holds those wireless nodes which are respectively connected ahead to the wireless nodes 8, 9 connected to the node. The table shown in FIG. 9 is configured by learning the source MAC address in receiving a packet, a destination MAC address is searched for based on the table, and multihop transfer becomes possible together with conversion of the address of the IEEE 802.11 header.

Each functional block used for the explanation of the embodiment is typically realized by an LSI which is an integrated circuit. Those functional blocks may be separately integrated as single chips, or may be integrated as a single chip in such a manner as to include some of or all of functional blocks. An LSI may be called IC, a system LSI, a super LSI, or an ultra LSI depending on the difference in integration density.

The scheme of integration is not limited to an LSI, and may be realized by an exclusive circuit or a general-purpose processor. An FPGA (Field Programmable Gate Array) programmable after an LSI is manufactured, or a reconfigurable processor which enables reconfiguration of the connections and settings of circuit cells in an LSI may be used.

Further, if there appears an integration technique which replace an LSI due to the advancement of the semiconductor technology, or another technology derived from the semiconductor technology, it is needles to say that the functional blocks may be integrated using that technology. For example, application of a biotechnology may be possible.

INDUSTRIAL APPLICABILITY

Because the wireless node apparatus and multihop type wireless LAN system according to the invention transfer a packet among wireless nodes as done in a tree type LAN without intervening a root node which is a wireless node to be the origin of the tree, to achieve efficient communications among the wireless nodes, the apparatus and system are useful for a wireless node apparatus and a multihop type wireless LAN system that realizes communication among wireless node apparatuses in a network which enables ad-hoc mutual communications like a wireless LAN.

The invention claimed is:

1. A wireless node apparatus in a multihop wireless LAN with a tree structure having a plurality of wireless node apparatuses, at least some of which become relay apparatuses to ensure multihop communication, the multihop wireless LAN being constructed by a first wireless node apparatus of the wireless node apparatuses, higher-rank wireless node apparatuses located at higher levels than the first wireless node apparatus in the tree structure, and connectable to the first wireless node apparatus, and lower-rank wireless node apparatuses located at lower levels than the first wireless node apparatus in the tree structure, and connectable to the first wireless node apparatus, the wireless node apparatus being the first wireless node apparatus and comprising:
  a control unit that determines whether a local wireless node apparatus is a root wireless node apparatus positioned at a top of the tree structure;
  a status information acquiring unit that, when it is determined that the local wireless node apparatus is not the root wireless node apparatus, transmits a request to the higher-rank wireless node apparatuses to acquire status information of the higher-rank wireless node apparatuses, selects a second wireless node apparatus to which the local wireless node apparatus is to be connected from the higher-rank wireless node apparatuses, and connects to the second wireless node apparatus;
  a status information notifying unit that notifies status information of the local wireless node apparatus including a connection state stored in a memory area thereof to the lower-rank wireless node apparatuses which attempt to connect to the local wireless node apparatus, (i) if it is determined that the local wireless node apparatus is the root wireless node apparatus, after the determination, or (ii) if it is determined that the local wireless node apparatus is not the root wireless node apparatus, after the local wireless node apparatus connects to the second wireless node apparatus and a request is transmitted to acquire the status information of the local wireless node apparatus; and
  a bridge transfer unit that (i) transfers a packet from a third wireless node apparatus in the lower-rank wireless node apparatuses which is connected to the local wireless node apparatus to the second wireless node apparatus via the status information acquiring unit with a table including only information used by the wireless node apparatus which was stored beforehand for determining a transfer destination and replacing a header, the information relating to all wireless node apparatuses targeted as a transfer destination of the packet except the wireless node apparatus, the information comprising information of the MAC type indicating that the packet is received and an address of an IEEE 802.11 header of the received packet for every source MAC address, or (ii) transfers the packet from the third wireless node apparatus to a fourth wireless node apparatus in the lower-rank wireless node apparatuses which is connected directly to the local wireless node apparatus or to a wireless node apparatus hopped therefrom using the table, via the status information notifying unit, according to a first destination address of the packet from the third wireless node apparatus, and (iii) transfers a packet from the second wireless node apparatus to a fifth wireless node apparatus in the lower-rank wireless node apparatuses which is connected directly to the local wireless node apparatus or to a wireless node apparatus hopped therefrom using the table, via the status information notifying unit, according to a second destination address of the packet from the second wireless node apparatus.

2. The wireless node apparatus according to claim 1, wherein in case of selecting the second wireless node apparatus, when the status information of the higher-rank wireless node apparatuses includes a number of hops from the root wireless node apparatus, a maximum connection number which is a maximum number of the wireless node apparatuses connectable to the higher-rank wireless node apparatuses, and a current connection number which is a current number of the wireless node apparatuses connected to the higher-rank wireless node apparatuses, a wireless node apparatus with a minimum number of hops is selected as the second wireless node apparatus from those wireless node apparatuses whose current connection numbers have not reached the maximum connection number.

3. The wireless node apparatus according to claim 2, wherein in case of selecting the second wireless node apparatus, the wireless node apparatus whose current connection number is a minimum is selected as the second wireless node apparatus.

4. The wireless node apparatus according to claim 1, wherein in case of sending the packet from the third wireless node apparatus or the packet from the second wireless node apparatus to the wireless node apparatuses other than the local wireless node apparatus, the bridge transfer unit capsulates the packet to have a first MAC header indicating a final destination address and a first source address using a second MAC header having an address of a wireless node apparatus to be a next relay apparatus in a first predetermined field and an address of the local wireless node apparatus which is currently relaying in a second predetermined field.

5. The wireless node apparatus according to claim 4, wherein upon reception of the packet, the bridge transfer unit rewrites the address in the first predetermined field of the second MAC header with the address of the wireless node apparatus to be the next relay apparatus, and rewrites the address in the second predetermined field of the second MAC header with the address of the local wireless node apparatus.

6. The wireless node apparatus according to claim 4, wherein upon reception of the packet, the bridge transfer unit stores the first source address in the first MAC header and the address in the second predetermined field of the second MAC header in association with each other.

7. A multihop wireless LAN system having a tree structure comprising a plurality of wireless node apparatuses, at least some of which become relay apparatuses to ensure multihop communication, comprising a first wireless node apparatus of the wireless node apparatuses, higher-rank wireless node apparatuses located at higher levels than the first wireless node apparatus in the tree structure, and connectable to the first wireless node apparatus, and lower-rank wireless node apparatuses located at lower levels than the first wireless node apparatus in the tree structure, and connectable to the first wireless node apparatus,
  the first wireless node apparatus comprising:
    a control unit that determines whether a local wireless node apparatus is a root wireless node apparatus positioned at a top of the tree structure;
    a status information acquiring unit that, when it is determined that the local wireless node apparatus is not the root wireless node apparatus, transmits a request to the higher-rank wireless node apparatuses to acquire status information of the higher-rank wireless node apparatuses, selects a second wireless node apparatus to which the local wireless node apparatus is to be connected from the higher-rank wireless node apparatuses, and connects to the second wireless node apparatus;
    a status information notifying unit that notifies status information of the local wireless node apparatus including a connection state stored in a memory area thereof to the lower-rank wireless node apparatuses which attempt to connect to the local wireless node apparatus (i) after determining that the local wireless node apparatus is the root wireless node apparatus, or (ii) after the local wireless node apparatus connects to the second wireless node apparatus and a request is transmitted to acquire the status information of the local wireless node apparatus, if it is determined that the local wireless node apparatus is not the root wireless node apparatus; and a bridge transfer unit that transfers a packet from a third wireless node apparatus in the lower-rank wireless node apparatuses which is connected to the local wireless node apparatus to the second wireless node apparatus via the status information acquiring unit with a table including only information used by the wireless node apparatus which was stored beforehand for determining a transfer destination and replacing a header, the information relating to all wireless node apparatuses targeted as a transfer destination of the packet except the wireless node apparatus, the information comprising information of the MAC type that the packet is received and an address of an IEEE 802.11 header of the received packet for every source MAC address, or transfers the packet from the third wireless node apparatus to a fourth wireless node apparatus in the lower-rank wireless node apparatuses which is connected directly to the local wireless node apparatus or to a wireless node apparatus hopped therefrom using the table, via the status information notifying unit, according to a first destination address of the packet from the third wireless node apparatus, and (iii) transfers a packet from the second wireless node apparatus to a fifth wireless node apparatus in the lower-rank wireless node apparatuses which is connected directly to the local wireless node apparatus or to a wireless node apparatus hopped therefrom using the table, via the status information notifying unit, according to a second destination address of the packet from the second wireless node apparatus.

8. The multihop wireless LAN system according to claim 7, wherein in case of selecting the second wireless node apparatus, when the status information of the higher-rank wireless node apparatuses includes a number of hops from the root wireless node apparatus, a maximum connection number which is a maximum number of the wireless node apparatuses connectable to the higher-rank wireless node apparatuses, and a current connection number which is a current number of the wireless node apparatuses connected to the higher-rank wireless node apparatuses, a wireless node apparatus with a minimum number of hops is selected as the second wireless node apparatus from those wireless node apparatuses whose current connection numbers have not reached the maximum connection number.

9. The multihop wireless LAN system according to claim 8, wherein in case of selecting the second wireless node apparatus, the wireless node apparatus whose current connection number is a minimum is selected as the second wireless node apparatus.

10. The multihop wireless LAN system according to claim 7, wherein in case of sending the packet from the third wireless node apparatus or the packet from the second wireless node apparatus to the wireless node apparatuses other than the local wireless node apparatus, the first wireless node apparatus capsulates the packet to have a first MAC header indicating a final destination address and a first source address using a second MAC header having an address of a wireless node apparatus to be a next relay apparatus in a first predetermined field and an address of the local wireless node apparatus which is currently relaying in a second predetermined field.

11. The multihop wireless LAN system according to claim 10, wherein upon reception of the packet, the first wireless node apparatus rewrites the address in the first predetermined field of the second MAC header with the address of the wireless node apparatus to be the next relay apparatus, and rewrites the address in the second predetermined field of the second MAC header with the address of the local wireless node apparatus.

12. The multihop wireless LAN system according to claim 10, wherein upon reception of the packet, the first wireless node apparatus stores the first source address in the first MAC header and the address in the second predetermined field of the second MAC header in association with each other.

\* \* \* \* \*